(12) United States Patent
Stallmann

(10) Patent No.: US 10,330,131 B2
(45) Date of Patent: Jun. 25, 2019

(54) HYDRAULIC FLUID DE-AERATION DEVICE

(71) Applicant: Schaeffler Technologies AG & Co. KG, Herzogenaurach (DE)

(72) Inventor: John Stallmann, Washington, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 132 days.

(21) Appl. No.: 15/466,054

(22) Filed: Mar. 22, 2017

(65) Prior Publication Data
US 2017/0276154 A1  Sep. 28, 2017

Related U.S. Application Data

(60) Provisional application No. 62/312,731, filed on Mar. 24, 2016.

(51) Int. Cl.
| | |
|---|---|
| *B01D 19/00* | (2006.01) |
| *F15B 21/044* | (2019.01) |
| *F16N 39/00* | (2006.01) |
| *B04C 5/13* | (2006.01) |
| *B04C 5/14* | (2006.01) |
| *F02M 55/00* | (2006.01) |

(52) U.S. Cl.
CPC ........ *F15B 21/044* (2013.01); *B01D 19/0057* (2013.01); *B04C 5/13* (2013.01); *B04C 5/14* (2013.01); *F16N 39/002* (2013.01); *F02M 55/007* (2013.01)

(58) Field of Classification Search
CPC .............. F15B 21/044; B01D 19/0057; B01D 19/00–0495; B04C 5/13; B04C 5/14; F16N 39/002; F02M 55/007
See application file for complete search history.

(56) References Cited

U.S. PATENT DOCUMENTS

| | | | | |
|---|---|---|---|---|
| 4,806,135 | A | * | 2/1989 | Siposs ................. A61M 1/3627 210/304 |
| 2002/0007736 | A1 | | 1/2002 | Hearn et al. |
| 2014/0083290 | A1 | * | 3/2014 | Larson ............... B01D 19/0036 95/12 |
| 2015/0224423 | A1 | * | 8/2015 | Simcina ............. B01D 19/0057 95/260 |

FOREIGN PATENT DOCUMENTS

GB           763004 A     12/1956

* cited by examiner

*Primary Examiner* — T. Bennett McKenzie
(74) *Attorney, Agent, or Firm* — Matthew V. Evans

(57) ABSTRACT

A hydraulic fluid de-aeration device for a hydraulically actuated variable valve actuation system is provided. The device includes a bridge and a de-aeration chamber having an upper chamber, a lower chamber, and a central axis. A vent pipe is arranged along the central axis of the de-aeration chamber and can include at least one vent hole. The bridge is arranged such that hydraulic fluid flowing from the bridge is directed towards an outer wall of a top portion of the lower chamber. The device includes a cover that integrates the upper chamber with a vent hole for air that is expelled from the hydraulic fluid. An optional gasket or plate configured with at least one vent hole can be arranged between the upper and lower chamber. The vent pipe can be arranged within the cover and extend through the upper chamber to the lower chamber.

20 Claims, 5 Drawing Sheets

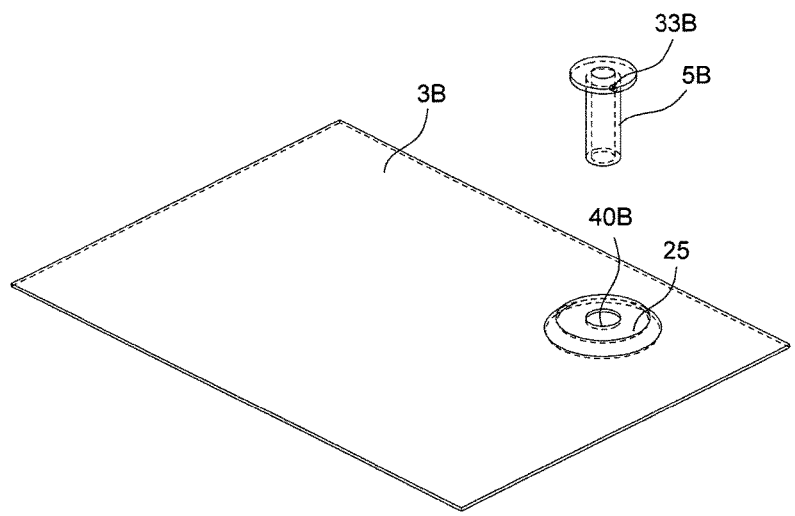
Figure 5B
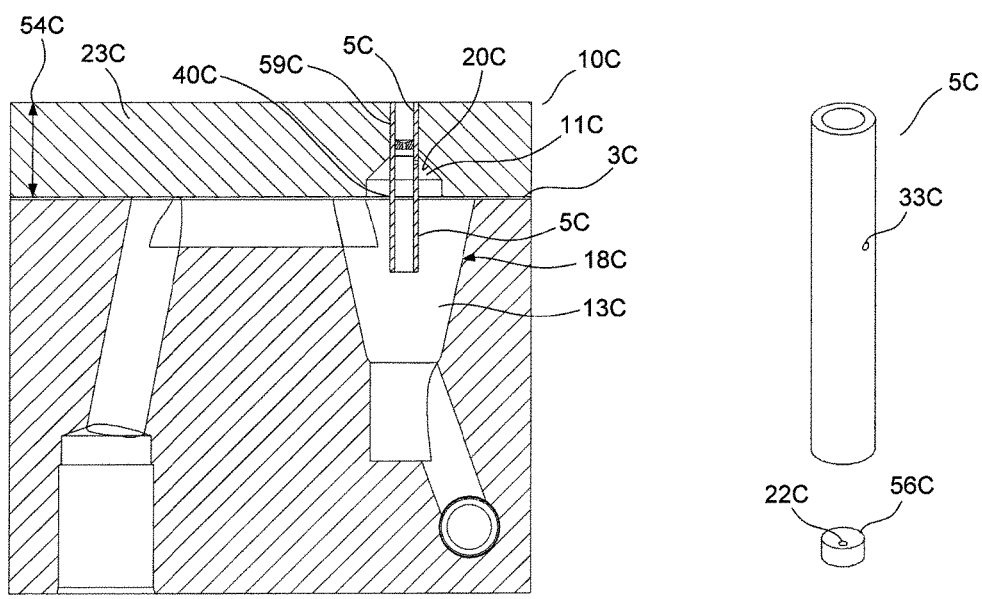
Figure 6A
Figure 6B

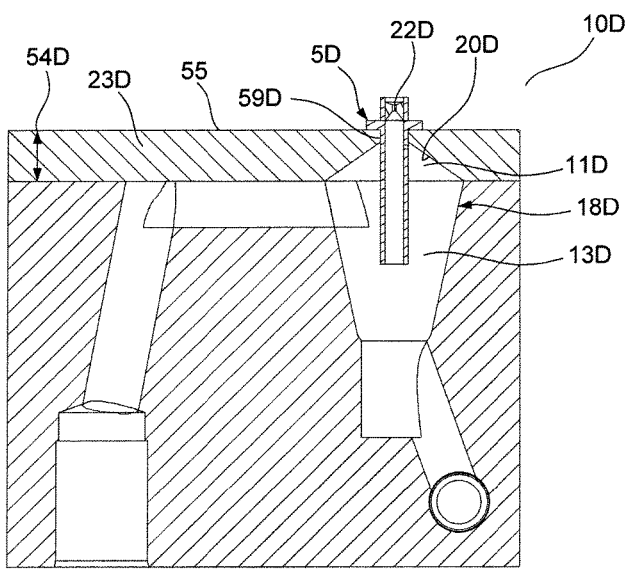
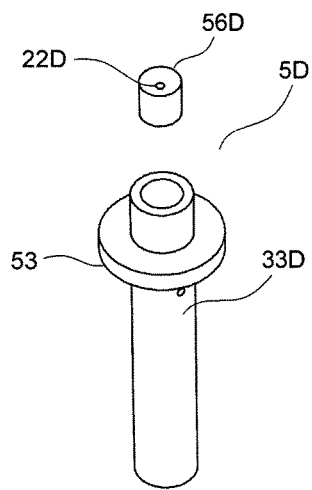
Figure 7A
Figure 7B

HYDRAULIC FLUID DE-AERATION DEVICE

INCORPORATION BY REFERENCE

The following documents are incorporated herein by reference as if fully set forth: U.S. Provisional Patent Application No. 62/312,731, filed Mar. 24, 2016 and U.S. Non-Provisional patent application Ser. No. 14/571,872, filed Dec. 16, 2014.

TECHNICAL FIELD

This invention is generally related to a de-aeration device for a hydraulic fluid.

BACKGROUND

Hydraulic fluid is often used to actuate components in machines, engines, or systems. Within an internal combustion engine, hydraulic fluid can actuate camshaft phasers or variable valve train components.

Hydraulic fluid typically consists of liquid and air. Excessive aeration or air content within the hydraulic fluid can be detrimental to the functionality of the component or system on which it acts. De-aeration devices are designed to remove or lessen air content from the fluid in order to improve its functioning characteristics. Fluid de-aeration devices for multiple applications are well known. One example of a de-aeration device includes a rotary chamber for a fuel supply system, see GB Patent No. 763,004. De-aeration devices for lubrication systems are also well known, see U.S. Patent Publication No. 2002/0007736. Existing types of de-aeration devices can use a single chamber or multiple chambers to circulate fluid to expel air from the fluid.

Known types of fluid de-aeration devices are not effective at removing or lessening the air content of a fluid at all flow rates for a given application. Additionally, known types of de-aeration devices are sensitive to de-aeration chamber forms that can be influenced by environmental packaging constraints.

SUMMARY

It would be desirable to provide a compact hydraulic fluid de-aeration device that includes a simple way to effectively de-aerate the hydraulic fluid at all required flow rates and packaging conditions. This is achieved according to the described example embodiments by incorporating a vent pipe within the de-aerating device, which enhances extraction of air from the hydraulic fluid while offering a variety of vent options and locations.

In an example embodiment, a hydraulic fluid de-aeration device includes a bridge, a de-aeration chamber, and a vent pipe. The bridge is connected at its second end to the de-aeration chamber having a central axis. The second end of the bridge is offset from the central axis of the de-aeration chamber. The de-aeration chamber has an upper chamber and a lower chamber. The upper chamber has a top surface and a first vent aperture that extends from the top surface to expel air gathered within the de-aeration chamber. The shape of the top surface can be at least partially frusto-conical, curved, or any other suitable form. The top surface and the first vent aperture can be formed within a cover that is arranged on top of the lower chamber. Hydraulic fluid traveling through the bridge is directed towards an outer wall of the top portion of the lower chamber, optionally frusto-conical in shape, facilitating a swirl motion of the fluid such that an increase in velocity occurs as it travels downward through a decreasing volume lower chamber. This shape also promotes an expansion which can furthermore enhance separation of air from a liquid due to their density difference. The increase in velocity causes the air to separate from the fluid, the air generally gathering in the center of the lower chamber. Additionally, recirculation zones within the fluid at expansions and sharp bends in the flow field can be used to separate the air and liquid. The vent pipe, having a lower end extending in the lower chamber, provides a flow path for the separated air to the upper chamber, facilitated by the fact that the upper chamber is at a lower pressure than the lower chamber. The vent pipe can be arranged such that it is received within a first through-aperture or hole of an optional gasket or plate arranged between the upper and lower chambers. The vent pipe can also be integrally formed with the gasket or plate. The gasket can be formed with an embossment, optionally frusto-conical in form, configured with the first through-aperture to receive the vent pipe. Multiple optional air paths can be arranged to facilitate a flow path from the lower chamber to the upper chamber for air that is present outside of the vent pipe. At least one second vent aperture or hole can be arranged in the gasket or plate. Additionally, at least one radial vent aperture can be arranged on the vent pipe. The de-aerated fluid continues its flow downward out of the lower chamber to an optional holding chamber, which is connected to an optional second passage that supplies fluid to a desired component or system.

A first passage and an inlet port can be present within the hydraulic fluid de-aeration device. A first end of the first passage can be connected to the inlet port, while a second end of the first passage can be connected to a first end of the bridge.

In an example embodiment, an upper end of the vent pipe extends to a second through-aperture arranged within an outer wall of the upper chamber. The vent pipe can be configured with at least one radial vent aperture to serve as an exit for the expelled air. The first vent aperture can be in the form of an insert that is disposed within the top portion of the vent pipe.

In another example embodiment, the vent pipe is configured to be installed from the top of the upper chamber of the de-aeration chamber. The vent pipe can have an integral stop to abut with an outer surface of the outer wall of the upper chamber.

Example embodiments with one or more features of the invention are described below and in the claims.

BRIEF DESCRIPTION OF THE DRAWINGS

The foregoing Summary as well as the following Detailed Description will be best understood when read in conjunction with the appended drawings. In the drawings:

FIG. 5B is an exploded perspective view, shown as a wireframe model for clarity, of an example embodiment of a vent pipe and gasket for the hydraulic fluid de-aeration device of FIG. 5A.

FIG. 6A is a cross-sectional view of an example embodiment of a hydraulic fluid de-aeration device.

FIG. 6B is a perspective view of an example embodiment of a vent pipe for the hydraulic fluid de-aeration device of FIG. 6A.

FIG. 7A is a cross-sectional view of an example embodiment of a hydraulic fluid de-aeration device.

FIG. 7B is a perspective view of an example embodiment of a vent pipe for the hydraulic fluid de-aeration device of FIG. 7A.

DETAILED DESCRIPTION OF THE EMBODIMENTS

Figure 1:
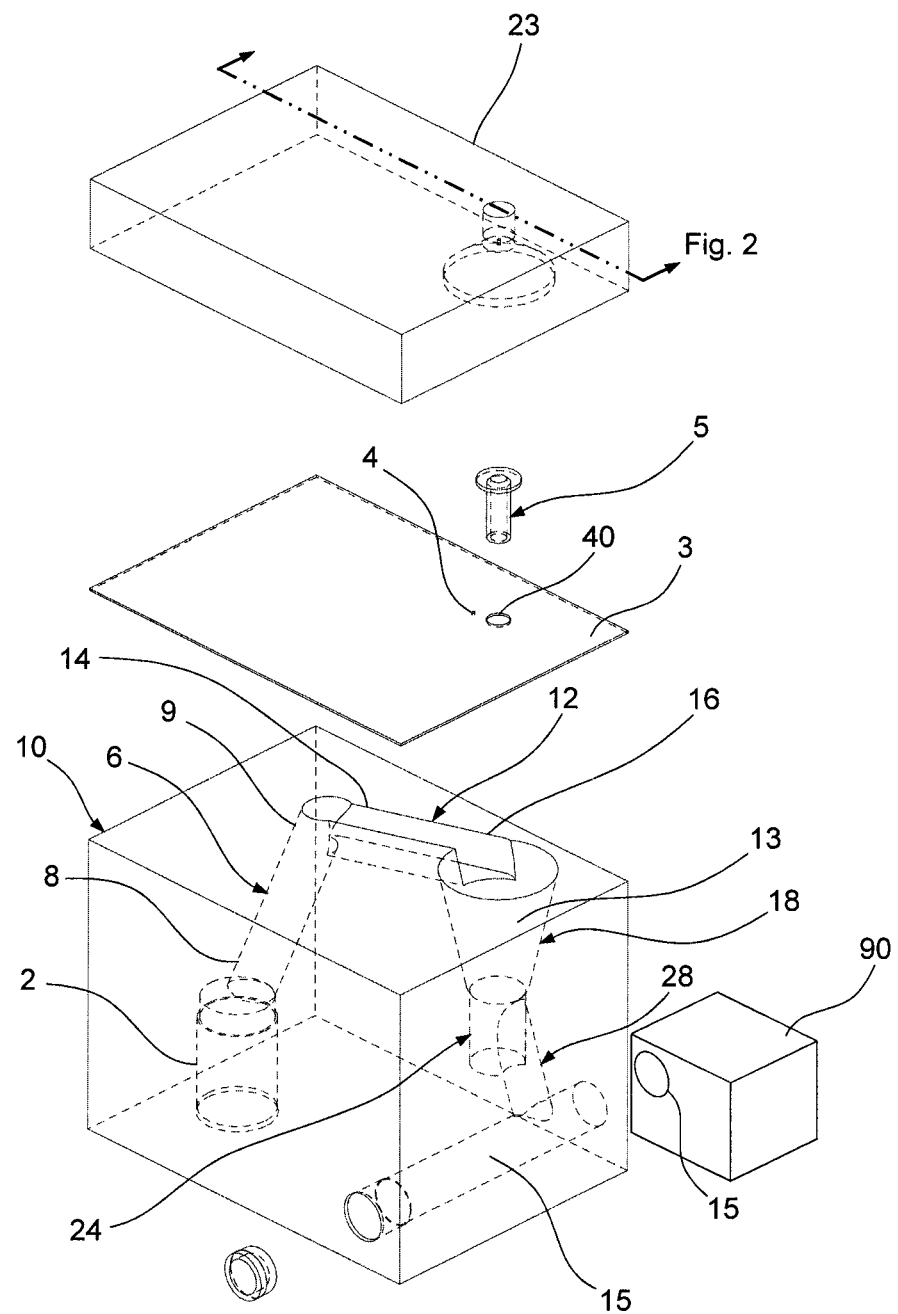
FIG. 1 is an exploded perspective view, shown as a wireframe model for clarity, of an example embodiment of a hydraulic fluid de-aeration device.

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. The words "left", "right", "up", "upward", "down", "downward", "top", and "bottom" designate directions in the drawings to which reference is made. The terminology includes the words specifically noted above, derivatives thereof, and words of similar import.

Figure 2:
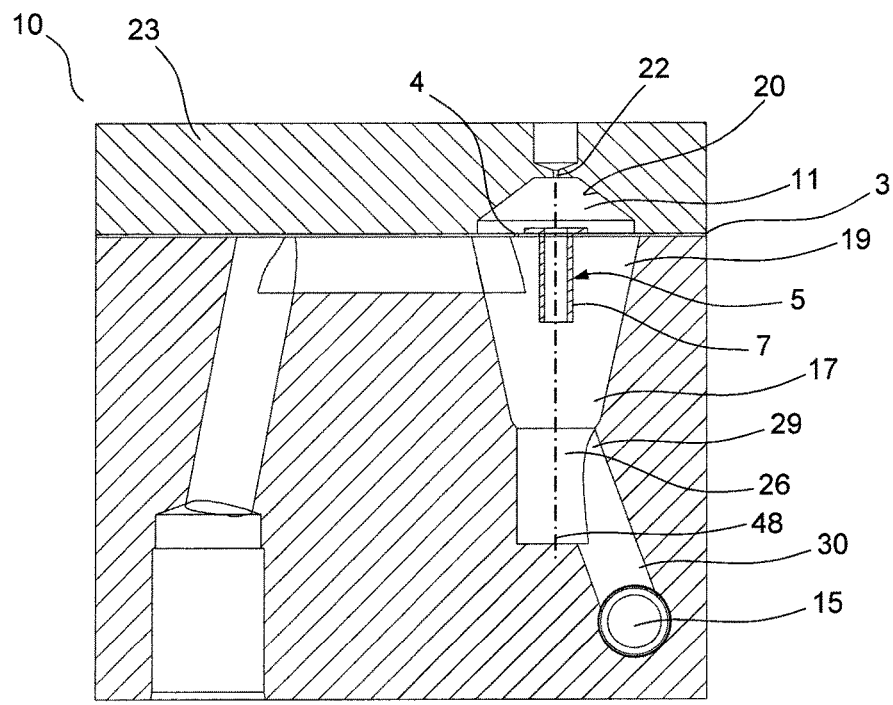
FIG. 2 is a cross-sectional view taken from FIG. 1.

As shown in FIGS. 1 and 2, an example embodiment of a hydraulic fluid de-aeration device 10 is provided. In this example embodiment the de-aeration device 10 provides hydraulic fluid to a system 90 or component, such as a variable valve actuation system of an internal combustion engine. The de-aeration device 10 can include an optional inlet port 2; the inlet port 2 can be located in a lower portion of the de-aeration device 10. The inlet port 2 can be connected to a pressurized hydraulic fluid supply line, such as that of an internal combustion engine. An optional first passage 6 having a first end 8 and a second end 9 can be connected to the inlet port 2 via the first end 8 of the first passage 6. The second end 9 of the first passage 6 can be connected to a bridge 12 having a first end 14 and a second end 16. The first end 14 of the bridge 12 can be connected to the second end 9 of the first passage 6. A de-aeration chamber 18 is connected to a second end 16 of the bridge 12. The de-aeration chamber 18 has an upper chamber 11, a lower chamber 13, and a central axis 48. A second end 16 of the bridge 12 is connected to a top portion 19 of the lower chamber 13 and is offset from the central axis 48 of the de-aeration chamber 18. Hydraulic fluid travelling through the bridge 12 is directed towards an outer wall of the top portion 19 of the lower chamber 13, shown as frusto-conical in shape, facilitating a swirl motion of the fluid such that an increase in velocity occurs as it travels downward through a decreasing volume of the lower chamber 13. The increase in velocity as well as an expansion at an intersection of the bridge and the lower chamber causes the air to separate from the fluid, the air generally gathering in the center of the lower chamber 13. The upper chamber 11 has a frusto-conical top surface 20, but can be of any functional form. A first vent aperture 22 extends from the top surface 20 of the upper chamber 11 to facilitate an exit path for the expelled air. The first vent aperture 22 can have various forms to facilitate proper venting function. Additionally, the efficiency of the de-aeration device 10 does not depend on the location of the first vent aperture 22; therefore, the first vent aperture 22 can vary in location along the top surface 20 of the upper chamber 11 and still maintain optimum performance of the de-aeration device 10. The first vent aperture 22 can be angled and does not have to be aligned with the central axis 48. The top surface 20 of the upper chamber 11 and the first vent aperture 22 can be formed within a cover 23 that is arranged on top of the lower chamber 13.

A vent pipe 5 is arranged along the central axis 48 of the de-aeration chamber 18 and has a lower end 7 extending in the lower chamber 13. The vent pipe 5 provides a flow path for the expelled or separated air from the lower chamber 13 to the upper chamber 11, facilitated by the fact that the upper chamber 11 is at a lower pressure than the lower chamber 13. The vent pipe 5 can be disposed within a first through-aperture 40 or hole of an optional gasket 3 or plate arranged between the upper chamber 11 and the lower chamber 13. The vent pipe 5 can be integrally formed with the gasket 3 or plate in order to reduce the number of components in the assembly. In addition to the vent pipe 5, an additional flow path for the air to travel from the lower chamber 13 to the upper chamber 11 can be provided by at least one second vent aperture 4 in the gasket 3. Once air is removed from the hydraulic fluid in the lower chamber 13, the de-aerated fluid continues its flow downward to an optional holding chamber 24; a top portion 26 of the holding chamber 24 is connected to a bottom portion 17 of the lower chamber 13. The de-aerated hydraulic fluid then continues through an optional second passage 28; a first end 29 of the second passage 28 is connected to the holding chamber 24. A second end 30 of the second passage 28 connects to a hydraulic fluid supply gallery 15 of a hydraulically actuated system 90 or component. Improved packaging of the de-aeration device 10 could be achieved by eliminating the second passage 28 and directly connecting the bottom portion 17 of the holding chamber 24 to the hydraulic fluid gallery 15 of the hydraulically actuated system 90 or component.

Figure 3:
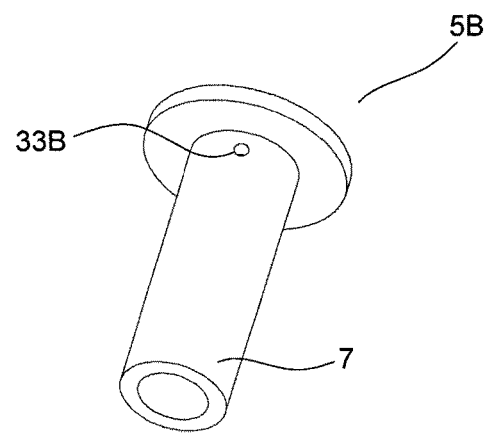
FIG. 3 is a perspective view of an example embodiment of a vent pipe.

FIG. 3 shows an example embodiment of a vent pipe 5B. In this embodiment, an alternative pathway is provided for the expelled air to travel from the lower chamber 13 to the upper chamber 11 in the form of at least one radial vent aperture 33B located on the vent pipe 5B.

Figure 4:
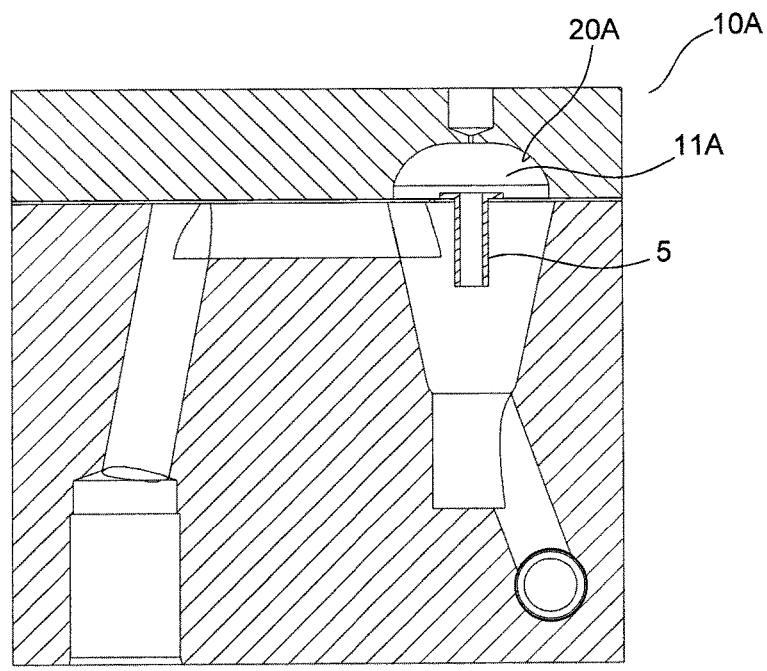
FIG. 4 is cross-sectional view of an example embodiment of a hydraulic fluid de-aeration device.

FIG. 4 shows an example embodiment of a de-aeration device 10A with an upper chamber 11A having a rounded top surface 20A. Any suitable top surface form that fulfills the function of the upper chamber 11A can also be utilized.

Figure 5A:
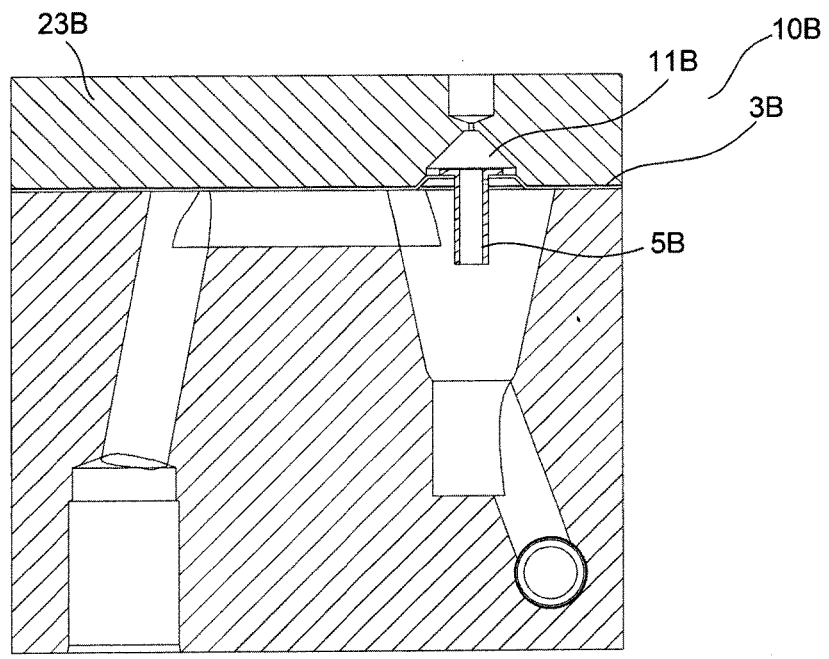
FIG. 5A is a cross-sectional view of an example embodiment of a hydraulic fluid de-aeration device.

FIGS. 5A and 5B show an example embodiment of a de-aeration device 10B with a gasket 3B or plate that has an embossment 25 formed within the gasket 3B. The embossment 25 is configured with a second through-aperture 40B which receives the vent pipe 5B. While the embossment 25 is shown as frusto-conical in form, other functional forms are also possible. The vent pipe 5B, configured with the previously described at least one radial vent aperture 33B, sits on top of the embossment 25. Optionally, an at least one second vent aperture (not shown) could be added to the embossment 25 to provide an additional air path for the separated air. Relative to the upper chamber 11 of FIG. 2's example embodiment, a smaller frusto-conical upper chamber 11B is shown in this example embodiment, offering reduced packaging space.

FIGS. 6A and 6B show an example embodiment of a de-aeration device 10C with an upper end of a vent pipe 5D disposed within a second through-aperture 59C arranged within an outer wall 54C of an upper chamber 11C. The outer wall 54C, the second through-aperture 59C, and a top surface 20C of the upper chamber 11C can be formed in a separate cover 23C. The vent pipe 5C extends through the upper chamber 11C and a portion of a lower chamber 13C of the de-aeration chamber 18C. An insert 56C with a first vent aperture 22C is arranged within the vent pipe 5C to serve as an exit for expelled air. The first vent aperture 22C could also be directly integrated within the vent pipe 5C without use of the insert 56C. The form of the insert 56C and the first aperture 22C can be different than what is shown in the figures. The gasket 3C separates the upper and lower chambers 11C, 13C and has a second through-aperture 40C to receive the vent pipe 5C.

FIGS. 7A and 7B show an example embodiment of a de-aeration device 10D with a vent pipe 5D disposed within a second through-aperture 59D arranged within an outer wall 54D of an upper chamber 11D. The outer wall 54D, the second through-aperture 59D, and a top surface 20D of the upper chamber 11D can be formed in a separate cover 23D. The vent pipe 5D extends through the upper chamber 11D and a portion of a lower chamber 13D of the de-aeration chamber 18D. An insert 56D with a first vent aperture 22D is arranged within the vent pipe 5D to serve as an exit for expelled air. The first vent aperture 22D could also be directly integrated within the vent pipe 5D without use of the insert 56D. The form of the insert 56D and the first aperture 22D can be different than what is shown in the figures. With this example embodiment, a gasket does not separate the upper and lower chambers 11D, 13D. Air can escape from the de-aeration chamber 18D by flowing up the vent pipe 5D from the lower chamber 13D or by flowing through an at least one radial vent hole 33D arranged on the vent pipe 5D. The vent pipe 5D is configured to be installed from the top of the upper chamber 11D through the second aperture 59D. A stop 53 is integrated within the vent pipe 5D that abuts with an outer surface 55 of the outer wall 54.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

What is claimed is:

1. A hydraulic fluid de-aeration device comprising:
a bridge;
a de-aeration chamber having:
an upper chamber; a first vent aperture extending from a top surface of the upper chamber;
a lower chamber having a decreasing volume from top to bottom, a top portion of the lower chamber connected to a second end of the bridge;
a central axis, a second end of the bridge offset from the central axis; and,
a vent pipe arranged within the de-aeration chamber along the central axis; a lower end of the vent pipe extending to the lower chamber.

2. The hydraulic fluid de-aeration device of claim 1, further comprising a first passage having:
a first end; and,
a second end connected to a first end of the bridge.

3. The hydraulic fluid de-aeration device of claim 1, further comprising a holding chamber having a top and a bottom portion, the top portion connected to a bottom portion of the de-aeration chamber.

4. The hydraulic fluid de-aeration device of claim 3, further comprising a second passage having a first end connected to the holding chamber, and a second end connected to a hydraulic fluid supply gallery of a hydraulically actuated system or component.

5. The hydraulic fluid de-aeration device of claim 1, wherein a top surface of the upper chamber is frusto-conical in form.

6. The hydraulic fluid de-aeration device of claim 1, wherein at least a portion of the top surface of the upper chamber is curved.

7. The hydraulic fluid de-aeration device of claim 1, wherein a top surface of the upper chamber and the first vent aperture are formed within a cover arranged on top of the lower chamber.

8. The hydraulic fluid de-aeration device of claim 1, wherein the lower chamber is frusto-conical in form.

9. The hydraulic fluid de-aeration device of claim 1, further comprising a gasket arranged between the upper and lower chambers, the gasket including a first through-aperture that receives the vent pipe.

10. The hydraulic fluid de-aeration device of claim 9, further comprising at least one second vent aperture arranged within the gasket.

11. The hydraulic fluid de-aeration device of claim 9, wherein the gasket is configured with an embossment configured with the first through-aperture to receive the vent pipe.

12. The hydraulic fluid de-aeration device of claim 11, wherein the embossment is frusto-conical in form.

13. The hydraulic fluid de-aeration device of claim 9, wherein the vent pipe is formed integrally with the gasket.

14. The hydraulic fluid de-aeration device of claim 1, further comprising at least one radial vent aperture arranged on the vent pipe.

15. The hydraulic fluid de-aeration device of claim 1, wherein the vent pipe is configured with the first vent aperture, an upper end of the vent pipe extending through the upper chamber and disposed within a second through-aperture arranged within an outer wall of the upper chamber.

16. The hydraulic fluid de-aeration device of claim 15, wherein a top surface of the upper chamber and the second through-aperture are formed within a cover arranged on top of the lower chamber.

17. The hydraulic fluid de-aeration device of claim 15, wherein the first vent aperture is arranged within an insert disposed within the vent pipe.

18. The hydraulic fluid de-aeration device of claim 16, wherein the vent pipe is configured to be installed from the top of the upper chamber, the vent pipe having a stop arranged to abut with an outer surface of the outer wall.

19. A hydraulic fluid de-aeration device comprising:
a bridge;
a de-aeration chamber having:
an upper chamber; a first vent aperture extending from a top surface of the upper chamber;

a lower chamber having a decreasing volume from top to bottom, a top portion of the lower chamber connected to a second end of the bridge;

a central axis, a second end of the bridge offset from the central axis; and, a vent pipe arranged within the de-aeration chamber along the central axis; a lower end of the vent pipe extending within the lower chamber.

20. A hydraulic fluid de-aeration device comprising:

a bridge;

a de-aeration chamber connected to a second end of the bridge, the de-aeration chamber having:

an upper chamber; a first vent aperture extending from a top surface of the upper chamber;

a lower chamber having a decreasing volume from top to bottom;

a central axis, a second end of the bridge offset from the central axis; and, a vent pipe arranged within the de-aeration chamber along the central axis; a lower end of the vent pipe extending to the lower chamber.

\* \* \* \* \*